US010692399B2

(12) United States Patent
Shiose

(10) Patent No.: US 10,692,399 B2
(45) Date of Patent: Jun. 23, 2020

(54) BRAILLE TACTILE SENSATION PRESENTING DEVICE AND IMAGE FORMING APPARATUS

(71) Applicant: KYOCERA Document Solutions Inc., Osaka (JP)

(72) Inventor: Masato Shiose, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 273 days.

(21) Appl. No.: 15/995,591

(22) Filed: Jun. 1, 2018

(65) Prior Publication Data

US 2018/0374387 A1 Dec. 27, 2018

(30) Foreign Application Priority Data

Jun. 22, 2017 (JP) ................................ 2017-122514

(51) Int. Cl.

*G09B 21/00* (2006.01)
*G06F 3/0488* (2013.01)
*G06F 3/041* (2006.01)
*G06F 3/01* (2006.01)
*H04N 1/00* (2006.01)

(52) U.S. Cl.

CPC ........... *G09B 21/003* (2013.01); *G06F 3/016* (2013.01); *G06F 3/0414* (2013.01); *G06F 3/04883* (2013.01); *H04N 1/00* (2013.01)

(58) Field of Classification Search

CPC ......... G09B 21/00; G09B 21/003; G06F 3/00; G06F 3/01; G06F 3/016; G06F 3/04; G06F 3/0414; G06F 3/04883; H04N 1/00

See application file for complete search history.

(56) References Cited

U.S. PATENT DOCUMENTS 9,658,746 B2 * 5/2017 Cohn .................. G06F 3/04883
10,521,010 B2 * 12/2019 Richter ................. G06T 19/006
2013/0332827 A1 * 12/2013 Smith .................. G09B 21/007 715/702
2014/0215340 A1 * 7/2014 Shetty .................. G06F 3/0488 715/727
2016/0295031 A1 10/2016 Tobinaga

FOREIGN PATENT DOCUMENTS

JP 2016-193502 A 11/2016

* cited by examiner

*Primary Examiner* — Timothy A Musselman
(74) *Attorney, Agent, or Firm* — IP Business Solutions, LLC

(57) ABSTRACT

A braille tactile sensation presenting device includes a tactile sensation presenting unit, a camera, a finger location specifying section, a braille conversion section, and a control section. The tactile sensation presenting unit applies ultrasonic stimulation to a finger of a user and causes the user to feel a tactile sensation. The camera shoots the user. The finger location specifying section specifies, from an image shot by the camera, a position of the finger of the user being held out in the air. The braille conversion section converts given character string into braille. The control section performs control of automatic scrolling on the braille converted by the braille conversion section and control of causing the tactile sensation presenting unit to output, to the position of the finger of the user specified by the finger location specifying section, ultrasonic stimulation representing each character of the braille to be automatically scrolled.

8 Claims, 6 Drawing Sheets

50 1 6 60 70 80 47 5 4 3 30 2 7

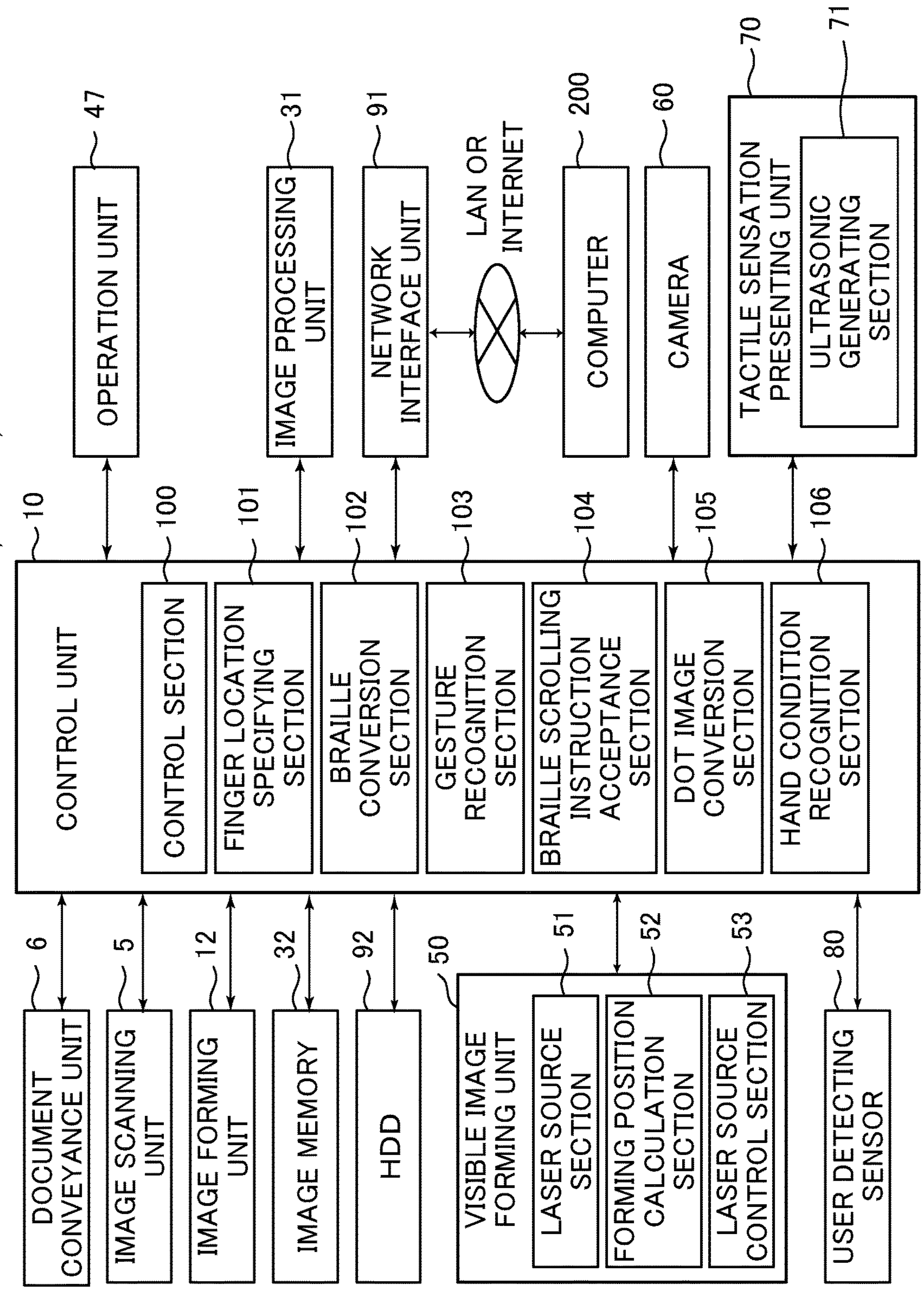

Fig.2
1
90
10
CONTROL UNIT
100
CONTROL SECTION
101
FINGER LOCATION SPECIFYING SECTION
102
BRAILLE CONVERSION SECTION
103
GESTURE RECOGNITION SECTION
104
BRAILLE SCROLLING INSTRUCTION ACCEPTANCE SECTION
105
DOT IMAGE CONVERSION SECTION
106
HAND CONDITION RECOGNITION SECTION
47
OPERATION UNIT
31
IMAGE PROCESSING UNIT
91
NETWORK INTERFACE UNIT
LAN OR INTERNET
200
COMPUTER
60
CAMERA
70
TACTILE SENSATION PRESENTING UNIT
71
ULTRASONIC GENERATING SECTION
6
DOCUMENT CONVEYANCE UNIT
5
IMAGE SCANNING UNIT
12
IMAGE FORMING UNIT
32
IMAGE MEMORY
92
HDD
50
VISIBLE IMAGE FORMING UNIT
51
LASER SOURCE SECTION
52
FORMING POSITION CALCULATION SECTION
53
LASER SOURCE CONTROL SECTION
80
USER DETECTING SENSOR

ONE EXAMPLE OF VISIBLE IMAGE D1
AAAAAAAA
AAAAAAAAAAAAAAA
BBBBBBB
BBBBBBBBBBBBBBB
CCCCCCCCCCCC
im1
im2
1
VISIBLE IMAGE D1
DOT IMAGE D2
72
50
1
6
60
5
70
80
47
4
30
3
2
7
H2

BRAILLE TACTILE SENSATION PRESENTING DEVICE AND IMAGE FORMING APPARATUS

INCORPORATION BY REFERENCE

This application claims priority to Japanese Patent Application No. 2017-122514 filed on Jun. 22, 2017, the entire contents of which are incorporated by reference herein.

BACKGROUND

The present disclosure relates to braille tactile sensation presenting devices and image forming apparatuses, and more particularly to a technique to form braille in the air.

In recent years, a display device that forms a visible image in the air to thereby display required information has been proposed. For example, there is an image forming apparatus that includes: a visible image forming unit that forms a visible image in the air; a display control section that controls operation of the visible image forming unit, the display control section being configured to cause the visible image forming unit to form the visible image that represents a display screen including an image to be formed; an acceptance section that accepts an operation performed by a user in the air on a display screen formed as the visible image by the visible image forming unit; and an image formation control section. In such the image forming apparatus, when the acceptance section accepts a predetermined user's gesture, the image formation control section removes an image in a range designated by the predetermined user's operation from the image to be formed.

SUMMARY

A technique improved over the above technique is proposed herein as an aspect of the present disclosure.

A braille tactile sensation presenting device according to an aspect of the present disclosure includes a tactile sensation presenting unit, a camera, a finger location specifying section, a braille conversion section, and a control section. The tactile sensation presenting unit applies ultrasonic stimulation to a finger of a user and causes the user to feel a tactile sensation. The camera shoots the user. The finger location specifying section specifies, from an image shot by the camera, a position of the finger of the user being held out in the air. The braille conversion section converts given character string into braille. The control section performs control of automatic scrolling on the braille converted by the braille conversion section and control of causing the tactile sensation presenting unit to output, to the position of the finger of the user specified by the finger location specifying section, ultrasonic stimulation representing each character of the braille to be automatically scrolled.

An image forming apparatus according to another aspect of the present disclosure includes the braille tactile sensation presenting device described above and an image forming unit that forms an image on a recording medium.

BRIEF DESCRIPTION OF THE DRAWINGS

FIG. 2 is a functional block diagram showing an essential internal configuration of the image forming apparatus.

DETAILED DESCRIPTION

Figure 1:
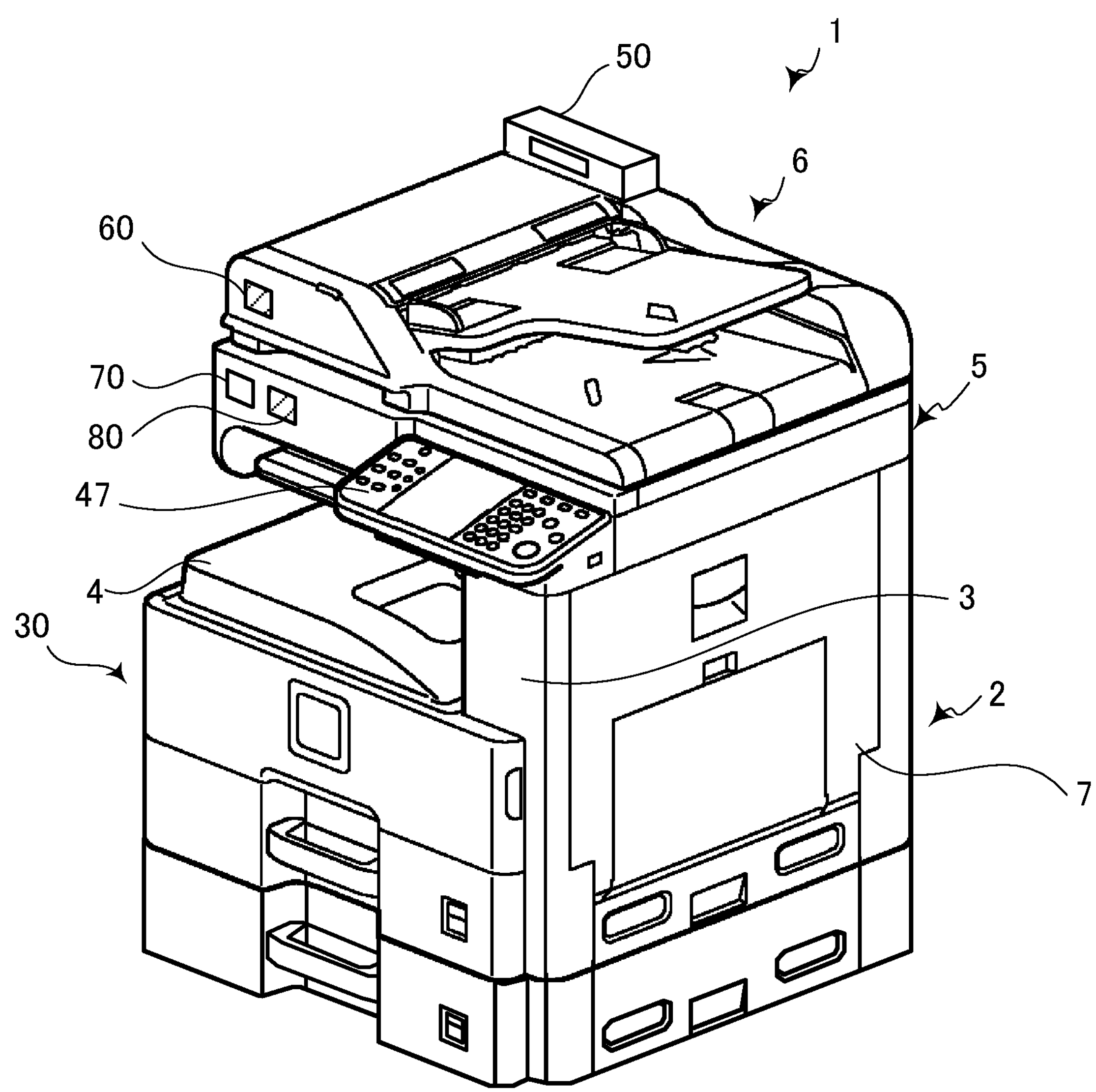
FIG. 1 is a perspective view showing an appearance of an image forming apparatus provided with a braille tactile sensation presenting device according to an embodiment of the present disclosure.

Hereinafter, a description will be given of a braille tactile sensation presenting device and an image forming apparatus according to an embodiment of the present disclosure with reference to the drawings. FIG. 1 is a perspective view showing an appearance of the image forming apparatus provided with the braille tactile sensation presenting device according to an embodiment of the present disclosure.

An image forming apparatus 1 is a multifunction peripheral having a plurality of functions, such as facsimile transmission, copying, printing, and scanning. As shown in FIG. 1, the image forming apparatus 1 includes a main body 2, an image scanning unit 5 located above the main body 2, and a joint portion 3 provided between the image scanning unit 5 and the main body 2.

A casing 7 constituting the outer shell of the image forming apparatus 1 accommodates therein a plurality of components that serve to realize various functions of the image forming apparatus 1. For example, the image scanning unit 5, an image forming unit 12 (see FIG. 2), a fixing unit, a paper feed unit 30, an visible image forming unit 50, a camera 60, and a tactile sensation presenting unit 70 are provided inside the casing 7.

The image scanning unit 5 is an auto document feeder (ADF) and includes a document conveyance unit 6 and a scanner: the scanner optically reads a source document conveyed from the document conveyance unit 6 or placed on a non-illustrated contact glass. The image scanning unit 5 scans source documents to be sent by facsimile one by one, thereby acquiring image data representing an image to be formed.

The image forming unit 12 includes photoconductor drums, charging units, exposure units, developing units, and a transfer unit, and forms (prints) an image on a recording sheet fed from the paper feed unit 30, on the basis of the image read by the image scanning unit 5 or print data transmitted from a personal computer connected to a network. The recording sheet having the image formed thereon undergoes fixing process performed by the fixing unit and is discharged to an output tray 4.

The visible image forming unit 50 forms a visible image in the air. (1) The visible image forming unit 50 intermittently emits an invisible laser beam and generates plasma by collecting the laser beam with lenses and mirrors, to thereby form, in the air, the visible image representing characters and pictures on the basis of the visible light from the plasma thus generated. Such a visible image forming method can be found, for example, in JP-A-No. 2003-233339 and JP-A-No. 2007-206588. (2) Alternatively, the visible image forming unit 50 may include an optical image forming device, to receive and reflect light from a display device and converge the reflected light at a symmetrical position of the display device with respect to the optical image forming device, to thereby form an object image in the air. Such a visible image forming method can be found, for example, in JP-A-No. 2013-127625. Hereinafter in this embodiment, the case where the visible image forming unit 50 adopts the configuration of the above (1) will be described as an example.

The camera 60 shoots a user who is present in front of the image forming apparatus 1.

The tactile sensation presenting unit 70 causes a finger, which is being held out by the user who is present in front of the image forming apparatus 1, to feel a tactile sensation. As means for causing the user to feel the tactile sensation, a known stereoscopic haptic image forming technique using aerial ultrasonic waves is used for example. In other words, the tactile sensation presenting unit 70 is provided with an ultrasonic generating section 71, and the tactile sensation presenting unit 70 causes the user to feel the tactile sensation by causing the ultrasonic generating section 71 to generate ultrasound and to apply the ultrasound to the user's finger.

An operation unit 47 includes, for example, a start key used for instructing execution of functions executable by the image forming apparatus 1, a determination key (enter key) used for finalizing a setting inputted by operating an operation screen, and numerical value input keys used for inputting numerical values.

A user detecting sensor 80 that detects a user, who is present within a predetermined range forward of the image forming apparatus 1, is provided at an end portion of the front face of the image forming apparatus 1. The user detecting sensor 80 is for example an optical sensor including a light emitter and a photodetector, and outputs a detection signal indicating that the user is present within the predetermined range forward of the image forming apparatus 1, to a control section 100 to be subsequently described, when the photodetector receives the light emitted from the light emitter and reflected by the user.

Hereunder, a configuration of the image forming apparatus 1 will be described. FIG. 2 is a functional block diagram showing an essential internal configuration of the image forming apparatus 1.

The image forming apparatus 1 includes a control unit 10. The control unit 10 includes a central processing unit (CPU), a RAM, a ROM, and an exclusive hardware circuit.

The image scanning unit 5 includes a reading mechanism having a light emitter, a CCD sensor, and so forth, and is configured to operate under control of the control unit 10. The image scanning unit 5 emits light from the light emitter onto the source document and receives the reflected light with the CCD sensor, thus to read an image from the source document.

An image processing unit 31 processes the data of the image read by the image scanning unit 5, as required. For example, the image processing unit 31 performs a predetermined image processing, such as shading correction, to improve the image quality after the image is read by the image scanning unit 5 and formed by the image forming unit 12.

An image memory 32 is a region for temporarily storing the image data of the source document read by the image scanning unit 5, and data to be formed into an image by the image forming unit 12.

The image forming unit 12 forms an image, for example based on print data read by the image scanning unit 5, and print data received from a computer 200 connected to the network.

The operation unit 47 receives, from an operator, instructions related to operations and processing that the image forming apparatus 1 is capable of performing.

The visible image forming unit 50 forms a visible image in the air, under the control of the control section 100. In this embodiment, the visible image forming unit 50 intermittently emits an invisible laser beam, and generates plasma by collecting the laser beam with lenses and mirrors, to thereby form, in the air, the visible image representing characters and pictures. The visible image forming unit 50 at least includes a laser source section 51, a forming position calculation section 52, and a laser source control section 53.

Under the control of the laser source control section 53, the laser source section 51 emits an invisible laser beam. The laser source section 51 includes a laser source that emits a laser beam, lenses and mirrors that collect the laser beam from the laser source to thereby generate plasma, and a scanning mechanism that allows the laser source, as well as the lenses and mirrors to perform a scanning action.

The forming position calculation section 52 calculates the emission direction and emission position of the laser beam from the laser source section 51, so as to allow the visible image representing a screen image received from the control section 100 to be formed at a predetermined visible image forming position (position on a predetermined three-dimensional coordinate system). In other words, the forming position calculation section 52 calculates the visible image forming position where the laser source section 51 is to generate the plasma.

The laser source control section 53 controls the laser source section 51, so as to cause the air present in the emission direction and emission position of the laser beam, calculated by the forming position calculation section 52, to perform plasma emission. The visible image is generated by luminescent spots that appear at the intersections of two laser beams, and therefore the laser source control section 53 controls the laser source section 51 so as to adjust the timing to emit the two laser beams such that, for example, the positions of the luminescent spots correspond to the pixels constituting the image.

A network interface unit 91 includes a communication module such as a LAN board, and is configured to transmit and receive data to and from the computer 200 or other devices in the local area, through the LAN connected to the network interface unit 91. A plurality of computers 200 may be connected to the image forming apparatus 1.

A hard disc drive (HDD) 92 is a large-capacity storage device for storing, for example, the image data of the source document read by the image scanning unit 5.

The control unit 10 includes the control section 100, a finger location specifying section 101, a braille conversion section 102, a gesture recognition section 103, a braille scrolling instruction acceptance section 104, a dot image conversion section 105, and a hand state recognition section 106.

The control unit 10 acts as the control section 100, the finger location specifying section 101, the braille conversion section 102, the gesture recognition section 103, the braille scrolling instruction acceptance section 104, the dot image conversion section 105, and the hand state recognition section 106, by operation according to a control program installed in the HDD 92. However, the control section 100, the finger location specifying section 101, the braille conversion section 102, the gesture recognition section 103, the braille scrolling instruction acceptance section 104, the dot image conversion section 105, and the hand state recognition section 106 may each be constituted in the form of a hardware circuit instead of the operation by the control unit 10 in accordance with the control program.

The control section 100 is connected to the image scanning unit 5, the document conveyance unit 66, the image processing unit 31, the image memory 32, the image forming unit 12, the operation unit 47, the network interface unit 91, the HDD 92, the visible image forming unit 50, the camera 60, the tactile sensation presenting unit 70, and the user detecting sensor 80, to control the operation of the mentioned components.

The finger location specifying section 101 specifies, from an image shot by the camera 60, a position of the finger that is being held out in the air by the user who is present in front of the image forming apparatus 1. To be more specific, on the basis of the image shot by the camera 60, the finger location specifying section 101 performs image processing such as image thresholding, and pattern matching based on shading information, to thereby identify the image of the user's finger. In this embodiment, the finger location specifying section 101 determines whether the shot image is an image of a user's hand, through pattern matching between the image of the user's hand extracted from the shot image and a reference image showing the user's hand, which is previously stored in, for example, the HDD 92. Upon determining that the image shot by the camera 60 is the image of the user's hand, the finger location specifying section 101 further determines, through image processing such as pattern matching, whether the shot image includes a predetermined image of an index finger, to thereby recognize a specific finger (for example an index finger) on the hand in the shot image and specify a coordinate position of the specific finger on a three-dimensional coordinate.

The braille conversion section 102 recognizes a character string included in the image scanned by the image scanning unit 5 or the image received from the computer 200, and then converts the recognized character string into braille. A technique of optical character recognition (OCR) may be used to recognize the character string.

The gesture recognition section 103 recognizes, from images shot by the camera 60, a gesture of the user who is present in front of the image forming apparatus 1. To be more specific, the gesture recognition section 103 identifies images of the user's hand included in the images shot by the camera 60, detects a moving locus of the identified images included in the image shot by the camera 60, decides whether the detected moving locus matches any of loci each of which indicating one of a plurality of predetermined gestures, and recognizes the gesture performed by the user.

On the basis of each user gesture recognized by the gesture recognition section 103, the braille scrolling instruction acceptance section 104 accepts each instruction related to scrolling the braille being presented by the tactile sensation presenting unit 70. Examples of the instruction related to scrolling the braille are scroll speed adjustment, repeating, and backwinding. A correspondence relation between each user gesture and each braille scrolling instruction is preliminary defined. The braille scrolling instruction acceptance section 104 accepts the instruction related to scrolling the braille in accordance with the definition.

The dot image conversion section 105 converts, into a dot image, the image (for example, a photograph and a graphic image) scanned by the image scanning unit 5 or received from the computer 200. As a conversion method to the dot image by the dot image conversion section 105, dither processing, half-tone processing, Floyd Steinberg method or the like is used.

The hand state recognition section 106 recognizes, from the image shot by the camera 60, a state of the hand of the user who is present in front of the image forming apparatus 1. To be more specific, on the basis of the image shot by the camera 60, the hand state recognition section 106 performs image processing such as image thresholding, and pattern matching based on shading information, to thereby identify the image of the user's hand. In this embodiment, the hand state recognition section 106 discerns whether the user is holding out one hand or holding out both hands, through pattern matching between the image of the user's hand extracted from the shot image and the reference image (a predetermined image representing one hand and a predetermined image representing both hands) previously stored in, for example, the HDD 92.

The control section 100 performs control of automatic scrolling on the braille converted by the braille conversion section 102, and control of causing the tactile sensation presenting unit 70 to output, to the position of the user's finger specified by the finger location specifying section 101, ultrasonic stimulation representing each character of the braille to be automatically scrolled. In addition, the control section 100 controls scroll speed, repeating, and backwinding of the braille in accordance with the instruction accepted by the braille scrolling instruction acceptance section 104.

The control section 100 also performs control of causing the tactile sensation presenting unit 70 to output, to a certain region in the air, ultrasonic stimulation representing the dot image converted by the dot image conversion section 105. When the hand state recognition section 106 recognizes that the user is holding out both hands, the control section 100 performs the control of causing the tactile sensation presenting unit 70 to output the ultrasonic stimulation representing the dot image having been converted by the dot image conversion section 105. In a case other than just-described, the control section 100 controls the tactile sensation presenting unit 70 so as to output the ultrasonic stimulation representing each character of the braille and performs switching between presentation of the braille and presentation of the dot image.

The control section 100 causes the visible image forming unit 50 to form, in the air, the visible image corresponding to the ultrasonic stimulation that the control section 100 causes the tactile sensation presenting unit 70 to output. Presentation of braille and dot images by the tactile sensation presenting unit 70 are mainly for visually impaired people. From only the presentation of the braille and the dot images by the tactile sensation presenting unit 70, unimpaired people who support visually impaired people cannot see what are being presented by the braille and the dot image. To cope with that, the visible image forming unit 50 is configured to form, in the air, the visible image corresponding to the ultrasonic stimulation. This allows the unimpaired people who support the visually impaired people to recognize the contents of the braille and the images that are being provided with the visually impaired people. A braille tactile sensation presenting device 90 includes the tactile sensation presenting unit 70, the camera 60, the finger location specifying section 101, the braille conversion section 102, the control section 100, the gesture recognition section 103, the braille scrolling instruction acceptance section 104, the dot image conversion section 105, the hand state recognition section 106, and the visible image forming unit 50.

Figure 3:
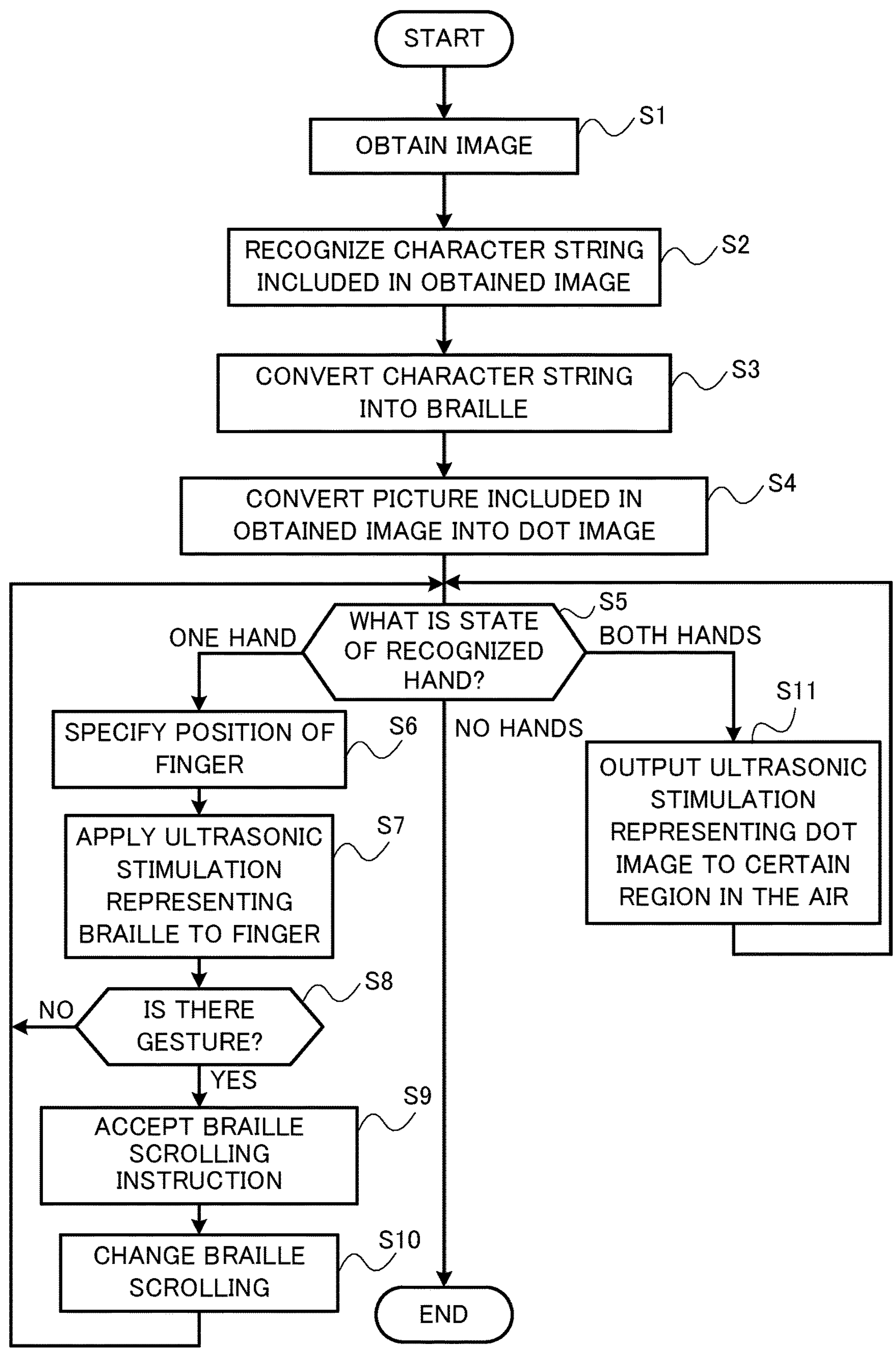
FIG. 3 is a flowchart showing processing of a braille tactile sensation presentation performed by the braille tactile sensation presenting device.

Hereunder, processing of a braille tactile sensation presentation performed by the braille tactile sensation presenting device 90 according to an embodiment of the present disclosure will be described. FIG. 3 is a flowchart showing the processing of the braille tactile sensation presentation performed by the braille tactile sensation presenting device 90 according to an embodiment of the present disclosure.

Firstly, the image including the character string to be outputted as braille by the tactile sensation presenting unit 70 is obtained (S1). For example, the image scanning unit 5 scans a source document and obtains the image. The image also may be obtained by the network interface unit 91 from the computer 200.

When the image is obtained through the image scanning unit 5, the braille conversion section 102 recognizes the character string included in the obtained image (S2), and then converts the character string into the braille (S3).

The dot image conversion section 105 converts the parts of the image other than the character string into a dot image: other parts of the image are, for example, a picture such as a photograph and an illustration (S4). The dot image conversion section 105 performs processing of making dot density of the whitish region of the original image become coarse in the dot image, and performs processing of making dot density of the darkish region of the original image be increased in the dot image.

Then, the hand state recognition section 106 recognizes, from the image shot by the camera 60, the state of the hand of the user who is present in front of the image forming apparatus 1 (S5). As a result of the recognition, when it is recognized by the hand state recognition section 106 that the user is holding out one hand ("ONE HAND" in S5), the finger location specifying section 101 specifies the position of the specific finger (for example, an index finger) of the hand that the user is holding out (S6).

When the position of the finger is specified, the control section 100 performs control of automatic scrolling on the braille converted by the braille conversion section 102, and control of causing the tactile sensation presenting unit 70 to output, to the position of the user's finger specified by the finger location specifying section 101, the ultrasonic stimulation representing each character of the braille to be automatically scrolled (S7).

Figure 4:
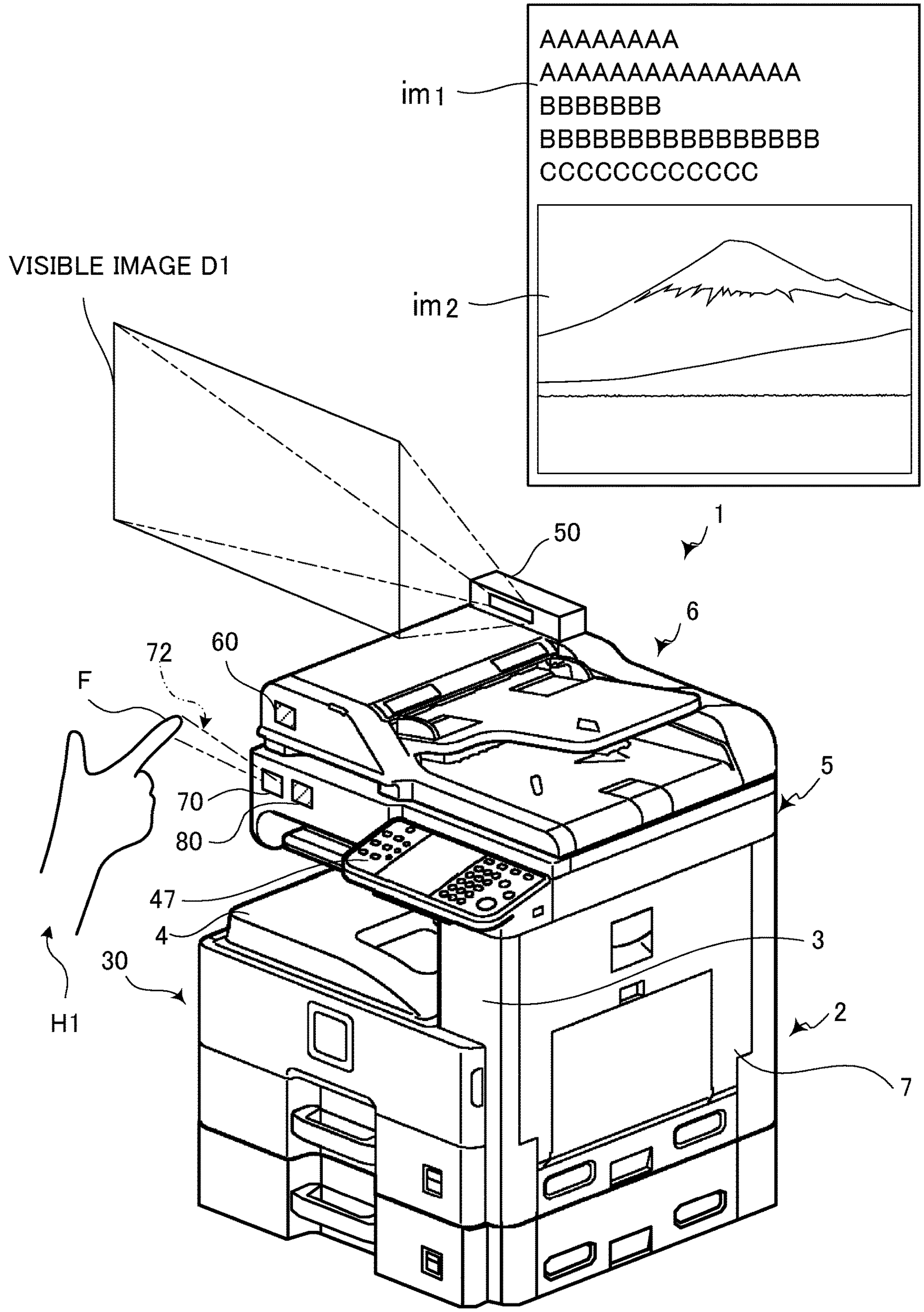
FIG. 4 is a diagram showing how braille is presented in the air when a user is holding out one hand.

FIG. 4 is a diagram showing how the braille is presented in the air when the user holds out one hand. The control section 100 causes the tactile sensation presenting unit 70 to emit ultrasound 72 to a narrow area within a user's index finger F of a one hand H1 that is held out by the user and to apply the ultrasonic stimulation representing the braille. For example, the control section 100 causes the braille conversion section 102 to convert an image portion im1 representing a character message, which is included in a visible image D1 shown in FIG. 4, into braille, and causes the tactile sensation presenting unit 70 to output the ultrasonic stimulation representing each character of the braille. This allows the user to read the braille by touching it in the air.

It is preferable that the control section 100 controls the tactile sensation presenting unit 70 and also is arranged to form the visible image D1 that shows the character string corresponding to the braille in a predetermined spatial position. Here, the predetermined spatial position where the visible image D1 is to be formed is, as shown in FIG. 4, a position near the same position as the front side surface portion of the image forming apparatus 1 in the front direction of the image forming apparatus 1: the position is a height position of the operator's eyes who is supposed to have a standard height.

Figure 5:
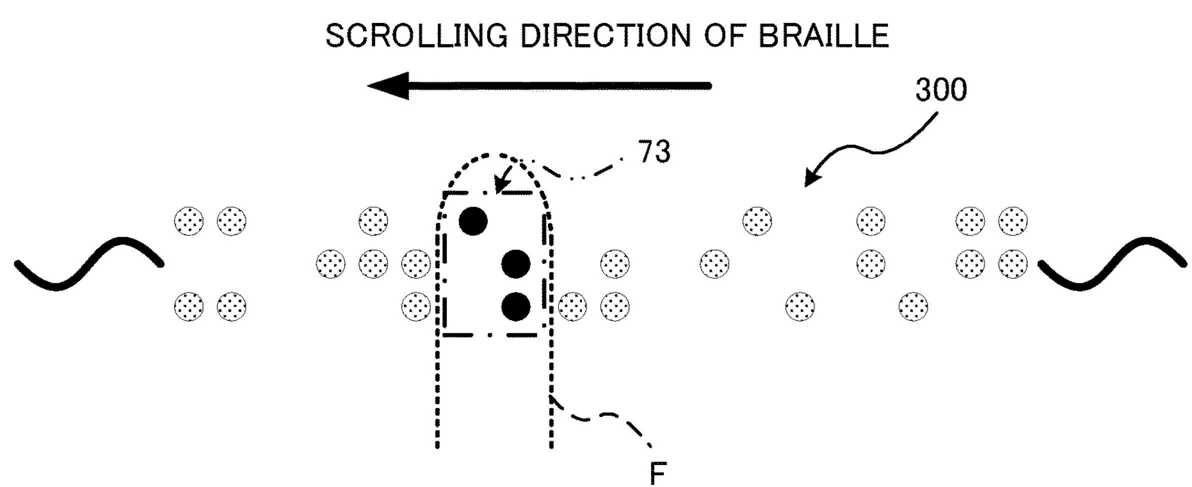
FIG. 5 is a diagram for explaining a scroll of braille presented in the air.

FIG. 5 is a diagram for explaining a scroll of the braille presented by the tactile sensation presenting unit 70. As described above, when the user holds out the one hand H1 in front of the image forming apparatus 1, the ultrasonic stimulation representing the braille is applied to the user's index finger F. The control section 100 controls the tactile sensation presenting unit 70 to automatically scroll braille 300 and to output the ultrasonic stimulation representing the braille that have reached a region 73 that is an inner surface of the user's index finger. This allows the user to read braille sentences while retaining the position of the index finger F. Furthermore, even when the user moves the one hand H1, the finger location specifying section 101 tracks the user's index finger F, so that the user can read the braille at an arbitrary position on the front side of the image forming apparatus 1.

Referring back to FIG. 3, the gesture recognition section 103 monitors the presence or absence of user gestures while the ultrasonic stimulation representing the braille is being outputted from the tactile sensation presenting unit 70. When no user gesture is recognized by the gesture recognition section 103 (NO in S8), the process goes back to S5 and the hand state recognition section 106 recognizes the state of the user's hand. When the user is maintaining the state of holding out the one hand, the ultrasonic stimulation is applied to the user's index finger F, allowing the user to continue to read the same braille.

On the other hand, in reading the braille, if the user performs a predetermined gesture, such as moving another finger (for example thumb) or shake the neck, the gesture recognition section 103 recognizes the gesture (YES in S8) and the braille scrolling instruction acceptance section 104 accepts the instruction related to scrolling the braille, the instruction of which corresponds to the user gesture recognized by the gesture recognition section 103 (S9). Examples of the instruction related to scrolling the braille are scroll speed adjustment, repeating, and backwinding. The control section 100 controls the output of the ultrasonic stimulation performed by the tactile sensation presenting unit 70 in accordance with the instruction accepted by the braille scrolling instruction acceptance section 104, thereby change the scroll speed, repeating, and backwinding of the braille (S10).

The process goes back to S5 thereafter, and the hand state recognition section 106 recognizes the state of the user's hand. When the user is maintaining the state of holding out the one hand ("ONE HAND" in S5), the output of the ultrasonic stimulation performed by the tactile sensation presenting unit 70 in which the speed of braille scrolling and the like are changed is continued, and the ultrasonic stimulation is applied to the user's index finger F.

When the hand state recognition section 106 recognizes, from the image shot by the camera 60, that the user who is present in front of the image forming apparatus 1 is holding out both hands ("BOTH HANDS" in S5), the control section 100 controls the tactile sensation presenting unit 70 to output, to a certain region in the air, the ultrasonic stimulation representing the dot image converted by the dot image conversion section 105 (S11). In other words, the control section 100 switches the output of the ultrasonic stimulation performed by the tactile sensation presenting unit 70 from braille output to dot image output.

Figure 6:
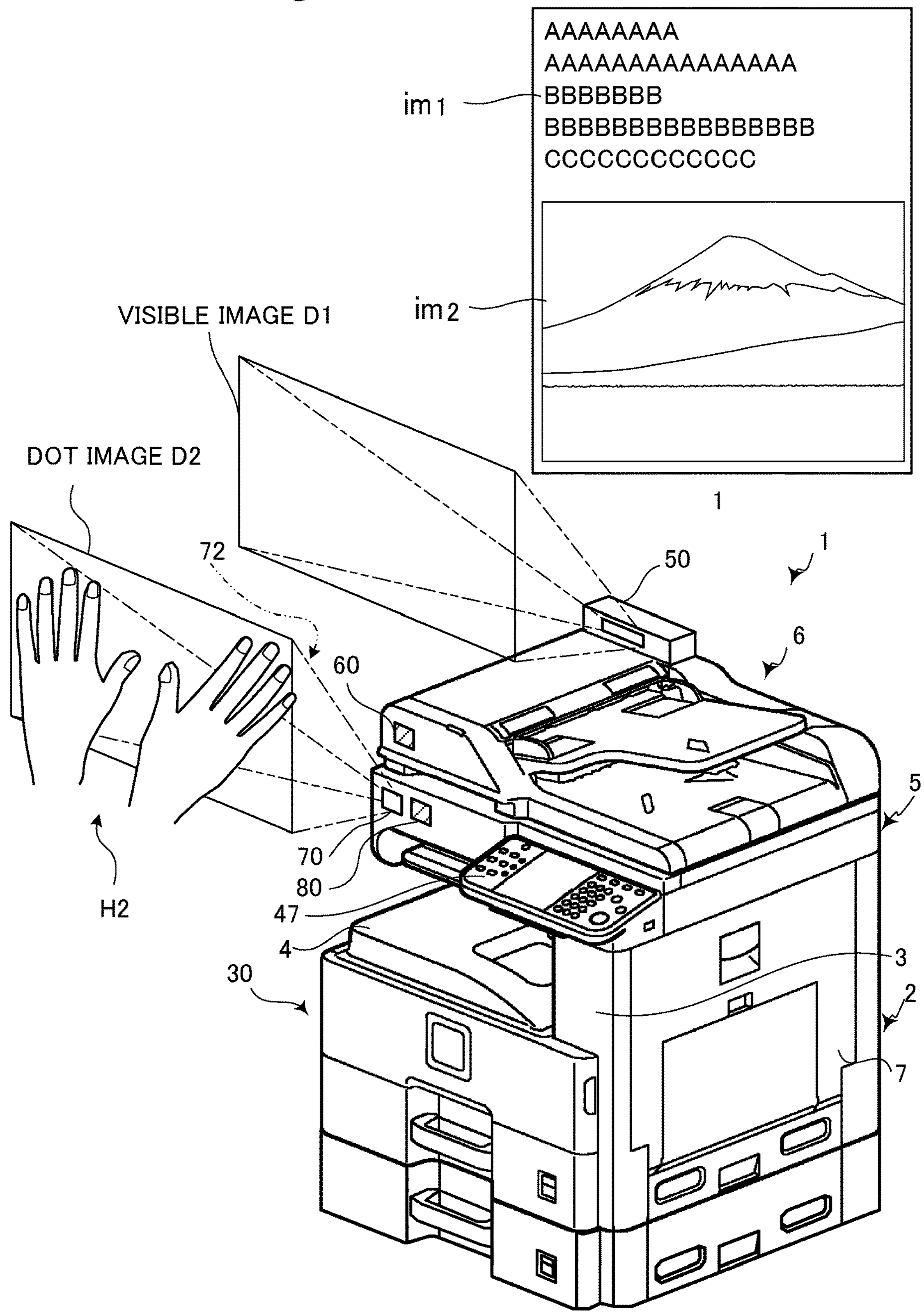
FIG. 6 is a diagram showing how a dot image is presented in the air when the user is holding out both hands.

FIG. 6 is a diagram showing how the dot image is presented in the air when the user holds out both hands. When the user holds out both hands H2 at the front side of the image forming apparatus 1, the tactile sensation presenting unit 70 outputs the ultrasound 72 representing a dot image D2 to a certain region in the air. For example, the control section 100 controls the tactile sensation presenting unit 70 to output the ultrasound 72 so that an image portion im2 indicating the mountain, which is included in the visible image D1 shown in FIG. 6, be as the dot image D2. By touching the dot image D2, the user can recognize an overview of the image from the density of dots.

As in the case shown in FIG. 4, while controlling the tactile sensation presenting unit 70, the control section 100 also may cause the visible image forming unit 50 to form the visible image D1 that corresponding to the dot image D2 in a predetermined spatial position.

Referring back to FIG. 3, even while the ultrasonic stimulation representing the dot image is outputted from the tactile sensation presenting unit 70, the hand state recognition section 106 recognizes, from the image shot by the camera 60, the state of the hand of the user who is present in front of the image forming apparatus 1 (S5). When the hand state recognition section 106 recognizes that the user is holding out the both hands ("BOTH HANDS" in S5), the control section 100 causes the tactile sensation presenting unit 70 to continuously output the dot image. If the user lowers one of both hands and the hand state recognition section 106 recognizes that the user is in the state of holding out one hand ("ONE HAND" in S5), the control section 100 switches the output of the ultrasonic stimulation performed by the tactile sensation presenting unit 70 to the dot image output.

If the user lowers both hands and the hand state recognition section 106 recognizes that no hands are held out by the user ("NO HANDS" in S5), the control section 100 instructs the tactile sensation presenting unit 70 and the visible image forming unit 50 to stop the output, to thereby end the processing of the braille tactile sensation presentation.

As thus far described, it is possible for the braille tactile sensation presenting device 90 according to a one embodiment of the present application to form tactile braille in the air for visually impaired people. The braille according to the present application is automatically scrolled, so that the user can read the braille without moving his/her finger. Furthermore, by performing a predetermined gesture, the user can adjust the scrolling speed and so on.

Braille displays that display braille for visually impaired people are known. Such braille displays display arbitrary braille by making each dot emerge from a plurality of holes drilled in a flat braille display surface. Thus, in the braille displays, there are problems such that a space representing braille is limited to a fixed narrow area. In addition, although it is possible to form a visible image in the air according to the image forming apparatus described in the aforementioned BACKGROUND, the user cannot feel tactile sensation by touching the visible image. Therefore, even if braille is displayed in the air using the image forming apparatus described above, the visually impaired people cannot touch the braille.

In contrast, in the present embodiment, it is possible to form a tactile braille in the air.

In addition, according to the braille tactile sensation presenting device 90 according to the present embodiment, it is possible to form not only braille but also the tactile dot images in the air. Furthermore, by forming a visible image in the air, the same sentences and images as those seen by the visually impaired people can be presented to unimpaired people who support the visually impaired people.

The present disclosure is not limited to the embodiments described above and various modifications thereto can be made. For example, although the case where the braille tactile sensation presenting device 90 is applied to the image forming apparatus 1 is detailed in the above embodiment, the braille tactile sensation presenting device 90 is widely applicable to electronic devices other than the image forming apparatus 1. Also, the gesture recognition section 103 may be arranged to recognize a user gesture from a detection signal of an acceleration sensor, instead of from the image shot by the camera 60.

Further, the configurations and processes of the embodiment described with reference to FIGS. 1 to 6 are merely exemplary, and not intended to limit the scope of the disclosure.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. A braille tactile sensation presenting device comprising:

a tactile sensation presenting unit that applies ultrasonic stimulation to a finger of a user and causes the user to feel a tactile sensation;

a camera that shoots the user;

a finger location specifying section that specifies, from an image shot by the camera, a position of the finger of the user being held out in the air;

a braille conversion section that converts a given character string into braille; and a control section that performs control of automatic scrolling on the braille converted by the braille conversion section and control of causing the tactile sensation presenting unit to output, to the position of the finger of the user specified by the finger location specifying section, ultrasonic stimulation representing each character of the braille to be automatically scrolled.

2. The braille tactile sensation presenting device according to claim 1, further comprising:

a gesture recognition section that recognizes a gesture of the user from images shot by the camera; and a braille scrolling instruction acceptance section that accepts, from the gesture of the user recognized by the gesture recognition section, an instruction related to scrolling the braille, wherein the control section controls scroll speed, repeating, and backwinding of the braille in accordance with the instruction accepted by the braille scrolling instruction acceptance section.

3. The braille tactile sensation presenting device according to claim 1, further comprising a dot image conversion section that converts a given image into a dot image, wherein the control section performs control of causing the tactile sensation presenting unit to output, to a certain region in the air, ultrasonic stimulation representing the dot image converted by the dot image conversion section.

4. The braille tactile sensation presenting device according to claim 3, further comprising a hand state recognition section that recognizes, from the image shot by the camera, a state of a hand of the user, wherein when the hand state recognition section recognizes that the user is holding out both hands, the control section causes the tactile sensation presenting unit to output the ultrasonic stimulation representing the dot image, and in a case other than just-described, the control section causes the tactile sensation presenting unit to output the ultrasonic stimulation representing each character of the braille.

5. The braille tactile sensation presenting device according to claim 1, further comprising a visible image forming unit that forms a visible image in the air, wherein the control section causes the visible image forming unit to form, in the air, the visible image corresponding to the ultrasonic stimulation that the control section causes the tactile sensation presenting unit to output.

6. The braille tactile sensation presenting device according to claim 2, wherein the gesture recognition section identifies an image of a hand of the user included in the image shot by the camera, detects a moving locus of the identified image in the image shot by the camera, decides whether the detected moving locus matches any of loci each of which indicating one of a plurality of predetermined gestures, and recognizes the gesture performed by the user.

7. The braille tactile sensation presenting device according to claim 4, further comprising a storage device that previously stores, as a reference image, a predetermined image representing one hand and a predetermined image representing both hands, wherein the hand state recognition section discerns whether the user is holding out one hand or holding out both hands, through pattern matching between an image of the hand of the user extracted from the shot image and the reference image previously stored in the storage device.

8. An image forming apparatus comprising:

the braille tactile sensation presenting device according to claim 1; and an image forming unit that forms an image on a recording medium.

* * * * *